Patented June 2, 1936

2,043,139

UNITED STATES PATENT OFFICE 2,043,139

PROCESS FOR MAKING BAKED GOODS FOR DIABETICS

Karl Wille and Eugen Fritsch, Duisburg, Germany, assignors to firm Rosing-Muhlen Aktiengesellschaft, Duisburg, Germany No Drawing. Application August 7, 1935, Serial No. 35,200. In Germany April 20, 1932

2 Claims. (Cl. 99—90)

This invention relates to a process for making baked goods for diabetics.

One object of the invention is the preparation of baked goods of the said kind which are practically free from carbohydrates and contain at most 0.5% of the same.

A further object of the invention is the production of baked goods from de-oiled rye or wheat germs or germs of other bread grain or cereal in such a way that the same form a shapable dough without addition of a binding agent.

For the purpose of making the dough two or several, preferably three, working steps are employed. In the first working step a dough is made from de-oiled germs of bread grain, which have not been ground, with a comparatively large quantity of yeast as well as lactic acid and water, and this is allowed to ferment for several days, preferably at raised temperature. In the next working step or steps further quantities of de-oiled, unground grain germs and yeast are added to this dough and the dough is allowed to ferment for a shorter time at room temperature. The dough produced thus is plastic and is thereupon baked.

The following process is advantageously employed:—

(1) As starting material whole wheat or rye germs are used which are obtained very clean by sieving out. According to analysis the constituents of these germs are as follows:—

| | Per cent |
|---|---|
| Ash | 5.3 |
| Fat | 11.8 |
| Albumen | 39.8 |
| Starch | 2.3 |
| Sugar | 19.9 |

The considerable fat content is first of all extracted by means of a suitable solvent, for example ether, and reduced to 0.3% as a result of which the flavour of the finished baked goods is no longer adversely influenced.

From 200 parts by weight of the germs a dough is prepared with 20 parts by weight of added yeast and a suitable quantity of water at a temperature of 35° C. without salt, to which two parts by weight of diastase, two parts by weight of soluble starch and 50 parts by weight of diluted lactic acid are added. The dough is kept for 24 hours at 30 degrees and then three to four times 24 hours at 15 to 17 degrees. The degree of acidity then amounts to 40 (i. e., 40 ccm. of N/10 caustic soda are required to neutralize the acid in 10 g. of dough) and, as a consequence of the changed karotin dyes, the dough assumes a blue-violet colouration.

In this part of the process the compact texture of the germ husks is destroyed partly by mechanical and partly by chemical processes, so that uncomminuted germs can be used without any addition for imparting plasticity. As a result of the employment of a large quantity of yeast, the initial high working temperature and the long working time, the dough is sufficiently loosened up. The initially scaly germs thereby disintegrate to a shapable mass. The yeast converts the starch present into sugar and consumes the same for its nutrition. The lactic acid has a destructive action on the nitrogen compounds of the germs, makes the dough looser, and converts the starch into soluble starch which is attacked more readily by the yeast. At the same time it protects the dough from foreign bacteria and varieties of yeast as well as prevents a formation of mould which otherwise might readily appear with the long time of working of the dough and the high temperature. As a result of the high acid content pleasant smelling flavouring substances form which impart to the finished baked goods a flavour similar to rye bread.

(2) 50 parts by weight of this preliminary dough are thoroughly mixed with 200 parts by weight of fresh germs, five parts by weight of yeast and four parts by weight of salt and kept (worked) for five hours at 30 degrees, the dough being beaten as frequently as possible. At the end of this period the degree of acidity amounts to 12.

In this part of the working of the dough it is necessary to add fresh yeast, since the yeast added to the preliminary dough has been consumed for the greater part in degrading the starch and sugar and the rest is degenerated. In the second part of the working there is a great increase in the yeast and simultaneously at the said temperature, in consequence of the enriched highly active enzymes, a complete degradation of the starch and sugar of the newly added germs. In this way a powerful loosening and a continuously increasing plasticity of the dough occurs. The more frequent beating promotes a rapid procedure of the fermentation.

(3) In order to make the main dough, to the said quantities of the second preliminary dough are added in addition 50 parts by weight of germs and so much lukewarm water that a semi-solid dough is formed. After 30 to 50 minutes fermentation the degree of acidity amounts to 5 to 6 and the dough is ready. The starch and sugar of the newly added germs are completely degraded therein as a result of the enzymes which are present to a copious extent. The finished dough is rolled out to a thickness of 3 mm. with a small amount of ground rye meal worked into it and stamped out into discs which are baked between wire nets in a moderately warm oven for at least 90 minutes.

Having now described our invention, what we claim as new and desire to secure by Letters Patent is:—

1. A method of making baked goods for diabetics consisting in fermenting for twenty-four hours at 30° C. and then for several days at 15 to 17° C. a mixture of 200 parts of de-oiled wheat or rye germs with 20 parts by weight of yeast and water at 30° C., 2 parts by weight of diastase and 2 parts by weight of soluble starch and 50 parts by weight of diluted lactic acid thereby making the dough looser and the starch soluble, then, following said fermentation, adding to 50 parts by weight of this mass 200 parts by weight of fresh germs, 5 parts by weight of yeast and 4 parts by weight of salt and fermenting the mixture for five hours at 30° C., then making the resulting dough plastic by means of 50 parts by weight of germs and water, fermenting for a short time, and then working a small amount of rye meal into the dough and rolling out the dough and finally baking it for at least 90 minutes.

2. A method of making baked goods for diabetics consisting in first fermenting a mixture of de-oiled grain germs, yeast, acid and water for about 24 hours at a temperature of about 30° C., then continuing the fermentation for three to four days at a temperature of 15 to 17° C., thereupon adding fresh germs and yeast and fermenting the mixture for four to five hours at a temperature of 30° C. adding more germs and sufficient water to form a semi-solid dough and finally after a short fermentation baking the dough.

KARL WILLE.
EUGEN FRITSCH.